Patented Aug. 6, 1940

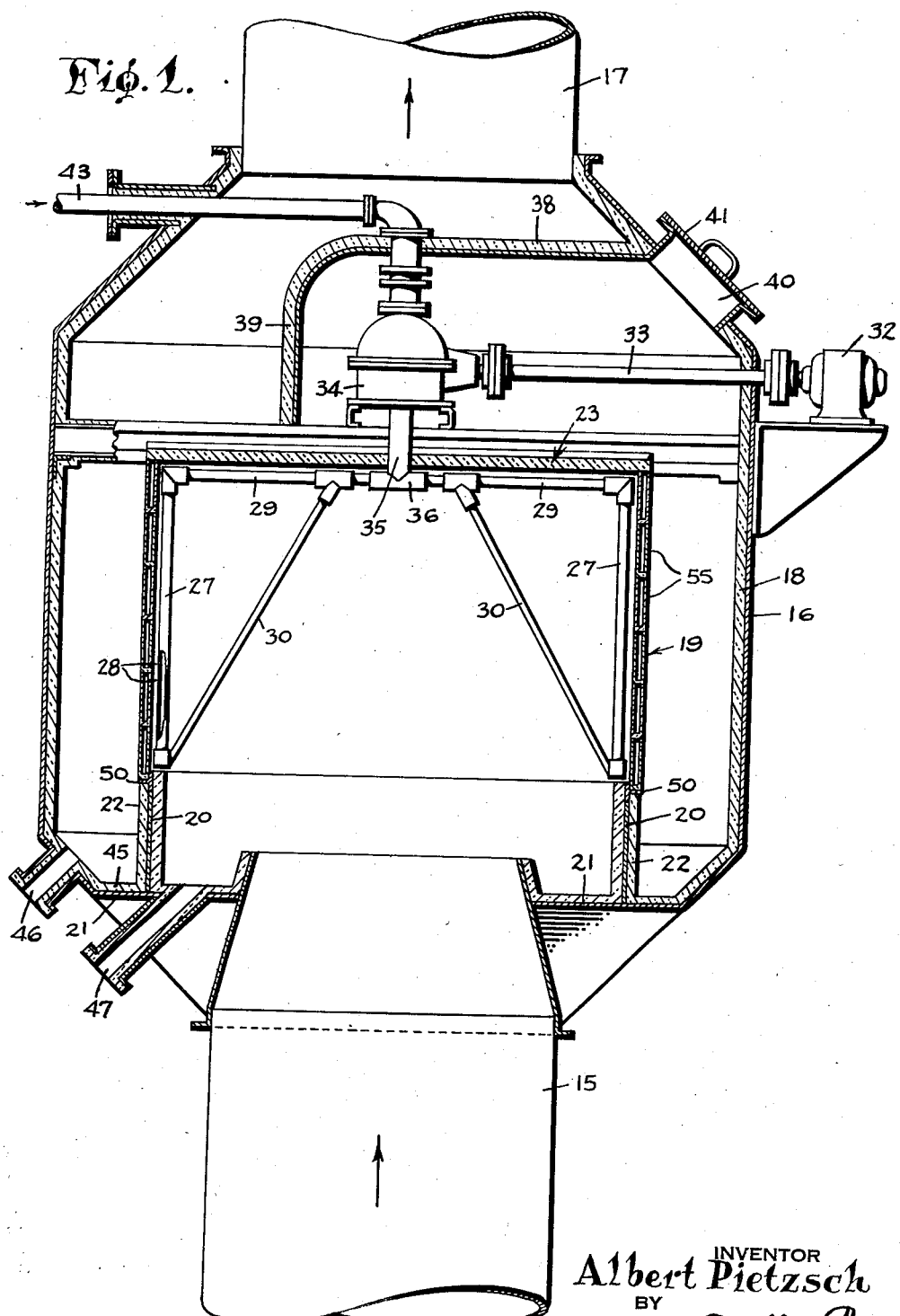

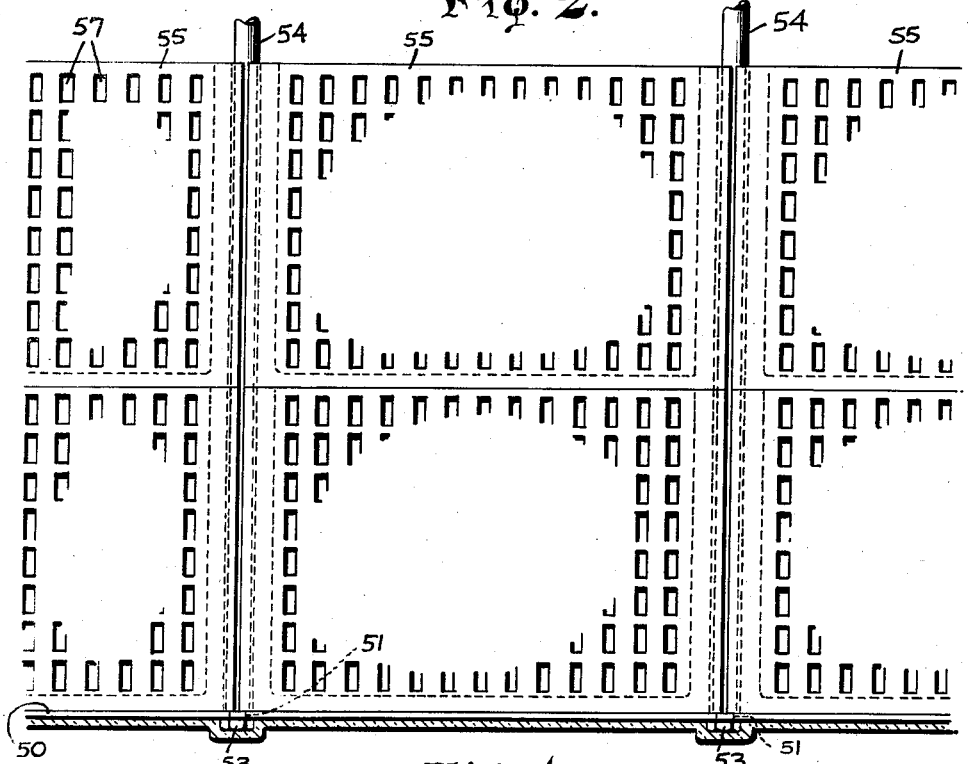
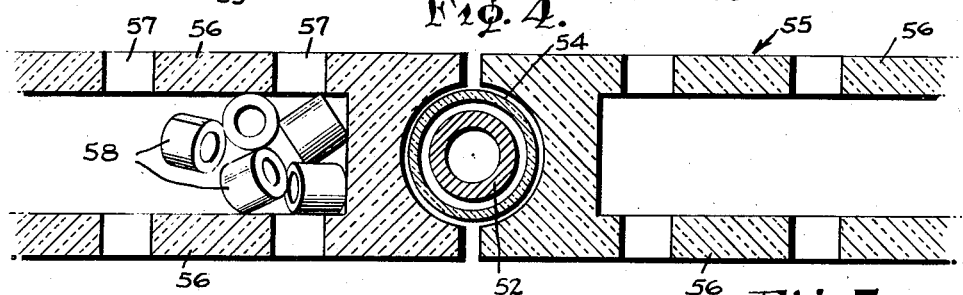
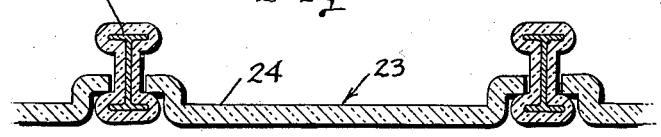
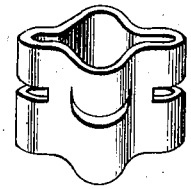

Fig. 3.
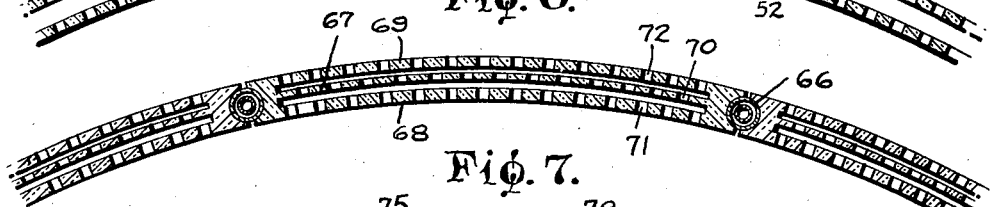
Fig. 6.
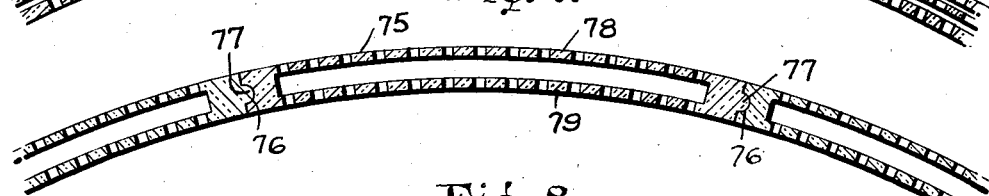
Fig. 7.
Fig. 8.
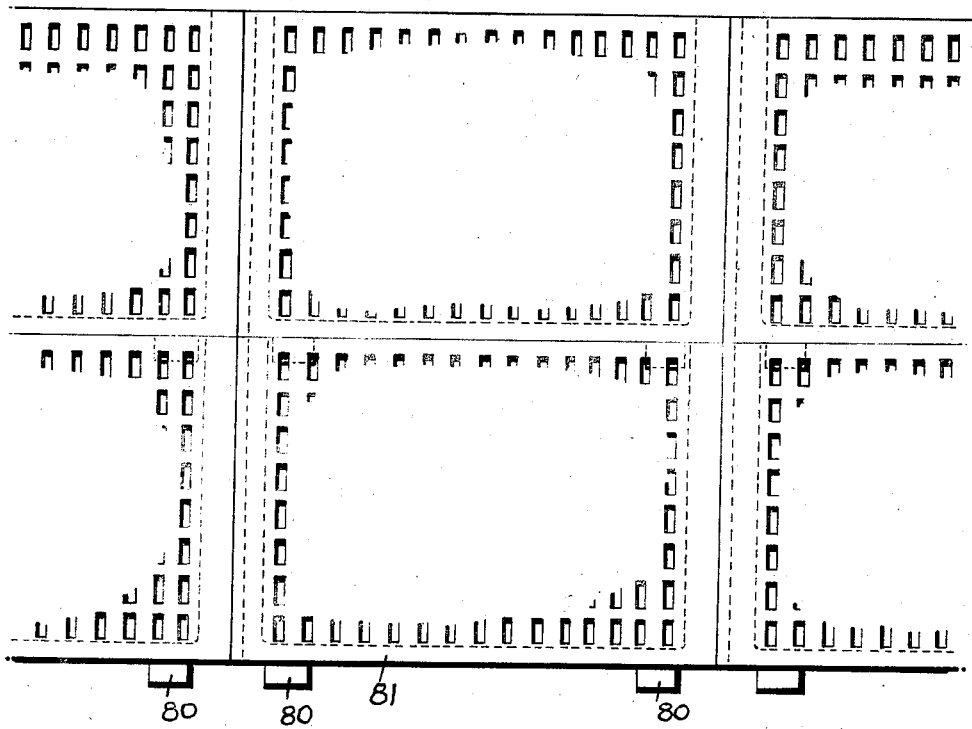

2,210,429

UNITED STATES PATENT OFFICE 2,210,429

APPARATUS FOR FILTERING GASES

Albert Pietzsch, Solln, Germany, assignor to Charles A. Buerk, Buffalo, N. Y.

Application October 22, 1936, Serial No. 107,043

1 Claim. (Cl. 261—106)

This invention relates to an apparatus for the purification of gases by means of liquid moistened filters whereby highly efficient purification or elimination of gases may be effected with small pressure gradients within the filter and whereby the dust or other extraneous matter removed from the gas may be eliminated from the filter with facility.

Heretofore it has been suggested to purify gases by bringing the gas into intimate contact with a liquid and a filter screen of the capillary type, such as one made by carrying metallic chips or shavings, glass wool, horse hair, felt, asbestos and the like, in suitable grids or nets made of iron, copper, bronze, zinc, and the like, according to the nature of the gas to be treated. As an example of wet filters of this type may be mentioned the lead or aluminum wool and wire filled filters.

In the prior procedure the gas to be purified is passed simultaneously with a liquid through the capillary filter, the surface of which is very large with respect to its volume. The liquid is passed through the filter in the same direction as the gas in intermittent fashion. It has been found that capillary filters of the type heretofore used interpose a substantial resistance to the passage of the gas and that the capillary filling material, as, for instance, metal wire or shavings, such as lead and the like, is corroded by the gas to be cleaned, forming dense, sponge-like material upon the exterior of the metallic shavings and gradually clogging the filters. This decreases the wet surface efficiency of the filter and at the same time builds up its resistance to the passage of gas.

The present invention is designed to provide a wet filter of extremely porous nature as contrasted to the capillary filters heretofore proposed, a filter provided with sufficient wet surface area to clean the gas being passed through it simultaneously with the intermittent passage of liquid, a filter in which the dust laden liquid carried upon the surface of the filter is intermittently removed by addition of fresh liquid and by the motion of the gas passing therethrough so that fresh cleansing liquid again wets the surface of the filter. By adding fresh cleaning liquid intermittently to the filter, the surface of the filtering material is kept permanently moistened for effectively removing dust and foreign matter from the gas to be cleaned, while at the same time the intermittent addition of fresh cleaning liquid to the inlet side of the filter drives the dust laden liquid to the exit side of the filter, thus effectively carrying away impurities deposited in the liquid from the gas.

In a preferred embodiment of the apparatus, the intermittent action of the cleaning fluid and continuous action of the gas may be effectively obtained by placing upon the gas inlet side of the filter an intermittently operating spraying device for delivering cleansing liquid to the gas inlet side of the filter. This device may be adapted to spray the entire surface simultaneously or in sections or zones at preferably regular intervals and is preferably automatically operated and controlled. In like fashion, the cleansing liquid may be fed to the gas inlet side of the filter in continuous manner and intermittent wetting of particular zones or areas of the filter obtained by rotating the filter and liquid feeding device relatively to each other.

In the preferred embodiment of the filter, girds, nets, pockets and the like, having perforated spaced walls, are provided, and means are interposed between the perforated spaced walls for producing a maze and thus causing the gas to pass through the filter through a circuitous and devious path and in contact with relatively smooth surfaces wet with the cleaning liquid. Thus, porcelain pockets having spaced parallel walls and provided with filling bodies having smooth exposed surfaces, as, for instance, the well-known Raschig rings, have been found to be ideally suited for this purpose, since the gas is caused to pass in a circuitous route through the filter in contact with smooth surfaces and surfaces wet with the cleaning fluid, thus effecting removal of dust and other foreign matter from the gas.

Although Raschig rings have been used heretofore in distillation columns and towers the vapors passing through the towers contact and pass through a relatively large mass of filling material and contact many rings as contrasted with the filters of the present invention where the filter is of inconsiderable thickness, is relatively porous and open and interposes only an inconsiderable obstruction to the passage of the gas to be cleaned.

In the drawings—

Fig. 1 is a vertical section with certain parts shown in elevation of a flue provided with a wet filter of the type contemplated by the present invention.

Fig. 2 is an enlarged fragmentary view in elevation of the wet filter of the present invention.

Fig. 3 is a fragmentary section of the filter shown in Fig. 2.

Fig. 4 is an enlarged section showing two adjacent segments of the filter of Fig. 3 with the curvature of the filter minimized and containing a filling material.

Fig. 5 illustrates another form of filling material.

Fig. 6 is a section through modified form of filter, while,

Fig. 7 represents a view in section of another modified form, of which

Fig. 8 is a front elevation showing union of various segments of filter pockets, and Fig. 9 is a vertical sectional view taken of Fig. 1.

Referring more particularly to the drawings, a flue entrance is shown at 15 in Fig. 1, discharging into a chamber 16 provided with an exit port 17 for carrying away flue gas discharged into the chamber by way of entrance port 15. Where the flue gases are generally corrosive in nature, the interior of chamber 16 is lined with corrosion resistant material, such as earthenware or porcelain lining 18 which may be attached to the interior of the chamber and of the structural members contained therein.

Positioned within chamber 16 and placed in such manner that gas flowing into the chamber from entrance flue 14 must pass therethrough, is a cylindrical filter 19. The filter is supported within chamber 16 in any convenient fashion, as, for instance, upon the uprights 20 supported upon cross members 21 and the whole surrounded by the fluid-tight skirt 22. In order to insure passage of the gas through the side walls of the cylindrical filter 19, the cover member 23 rests upon and covers the open end of the filter. The cover member may be positioned in any convenient fashion over the top of filter 19 and in the form shown, cover segments 24 are disposed with their side edges resting upon the lower flanges of the porcelain or earthenware covered I beams 25, producing an assembly substantially fluid-tight, preventing the passage of gas through the upper open end of the cylindrical filter and causing gas to flow through the side portions of the filter and into the chamber 16. Means are provided for intermittently wetting the filter 19 either by intermittent discharge of cleaning liquid, in general, water, against the gas entrance side of filter 19, or by continuously discharging cleaning fluid against the gas entrance side of the filter 19 and moving the discharge means continuously thereover. In the filter moistening means shown in the embodiment of the invention illustrated in Fig. 1, pipes 27 are positioned adjacent the gas inlet side of filter 19 and are provided with jets 28 for directing streams of liquid throughout an area of the filter. Pipes 27 are connected to and suspended from T member 29 and held firmly by means of the cross pieces 30 extending substantially from the lower end of pipes 27 angularly to the inner end or central portion of T 29.

In order to insure intermittent and complete wetting of the filter, provision is made for moving the wetting means and filter relative to one another. In the embodiment shown in Fig. 1, it is more practical to move the wetting means and keep the filter stationary and to this end motor 32 drives shaft 33 through reducing gears 34 which, in turn, operate hollow shaft 35 which extends through cover 23 and is attached to the T members by means of connection 36. To protect this mechanism from the action of corrosive gases, a surrounding housing 38 is connected to the walls of chamber 16 and extends inwardly and around the driving mechanism as shown, the depending skirt portion 39 extending downwardly to the cover 23 of filter 19. Manhole 40 is provided to permit access to the interior of the protecting cover formed by the wall and skirt members 38 and 39 and is covered by man-hole cover 41.

The water used as cleaning fluid is fed by means of feed line 43 into and through chamber 16 downwardly through the hollow shaft 35 and is then distributed to discharge nozzles or jets 28 by means of the T 29 and connecting pipes 27. A substantial part of the cleaning fluid passes through filter 19 due to the force with which the jets impact against the gas entrance side of the filter and also due to the directional effect and consequent motion imparted to the liquid within the interior of filter 19 by the motion of the gas passing therethrough. To collect the cleansing liquid, together with the matter removed from the gas, chamber 16 is provided with an annular flooring portion 45 forming with skirt 22 a run-off sump discharging through the discharge orifice 46. Likewise, the run-off orifice 47 is provided for discharging the cleaning fluid collecting within the interior sump formed with skirt 22 and the flooring 21.

Filter 19 is generally assembled in segments of individual pockets that possess considerably greater dimensions in two directions as compared with the thickness. As shown in Fig. 2, the supporting flange 50 of upright 20 is formed with spaced holes 51 through which project the threaded reduced ends of rod or pipe 52 which is secured by means of the nuts 53. These spaced pipes or rods 52 are covered with sleeves 54 of porcelain or other non-corrosive material and form mechanical keys or guides for holding the individual segments or pockets from which filter 19 is made. The individual segments or pockets 55 are formed generally in elongated hollow shapes with dimensions in two directions of a magnitude considerably greater than the width through which the gas normally passes. The segment, therefore, is formed with substantially parallel walls 56, which walls are perforated as at 57 in such manner that a substantial portion of the complete area of the filter is open, the perforations generally being of slightly smaller dimension than any filling material placed therein. In general, the total thickness of the filter segment is on the order of one and one-half to one and three quarters inches, although this thickness may vary, depending upon the installation, the rate of flow, volume of gas treated and other operating conditions. Segment 55 is formed with a semicylindrical groove at opposed ends in order that the segment may register with uprights 54 as shown and form a rigidly held, yet loosely assembled filter. Where desired, water-proof cement may be applied at the joints formed by adjacent edges of abutting segments. In general, the pockets or segments 55 are formed with an opening through which filling material may be placed between the walls. Usually the pockets are formed with a closed bottom and open top so that when the segments are placed one above the other, a tight joint is formed between the superposed segments or pockets which may be filled individually with filling material through the top of the pocket.

In accordance with the provisions of the present invention, the filling material added to the pockets or segments, possesses a continuous surface of substantial area and is relatively porous, imposing little resistance to the passage of gas therethrough as contrasted with the tightly packed interlaced fillers of the capillary type containing many small interstices and having relatively small areas of continuous interrupted surfaces. The filling material or elements are formed of any suitable composition that is not corroded by the gas to be cleaned and, in general, porcelain or earthenware is suggested. As shown in Fig. 4, the fillings used in the present invention, designed to present a large surface of contact between gas and liquid to avoid the formation of channels and to develop as little back pressure as possible, are short, hollow bodies 58, generally cylindrical and of a length substantially equal to their diameter, such as the well-known Raschig rings and filling elements such as those recommended generally for use for distilling towers. These filling elements are placed in a random, unordered fashion within the pockets and impose, when wetted with water or other cleansing liquid, a substantial area of wet contact surface and also provide a maze requiring the passage of gas through the filter in a deflected and circuitous manner without imposing any considerable resistance. At the same time as the gas containing foreign matter to be removed, as, for instance, dust, soot and the like, is deflected, it contacts with the wet filter surface, causing a general flow of the surface film of liquid to the exterior of the filter. This movement is aided by the intermittent wetting or supplying of fresh cleaning liquid, which also pushes or causes the surface film containing the removed extraneous matter to flow outwardly from the filter. For the type of installation shown, Raschig rings of ten millimeters in diameter and length have been found to be satisfactory. As mentioned, other filling elements may be used and another form is shown in Fig. 5.

A modified form of wet filter contemplated by the present invention is shown in Fig. 6 wherein the wet filter is made of a plurality of pockets or segments having spaced parallel perforated walls and formed with a groove in opposed end edges of the segments so that the segments may be assembled between upright members 66. An interior wall 67 is placed between the spaced parallel inner and outer walls 68 and 69. In order to provide an obstruction in the path of the gas inducing deflection of the gas, interiorly placed wall 67 contains perforations 70 placed in a staggered position with respect to the openings 71 of wall 68 and 72 of wall 69. When cleaning fluid is sprayed upon the gas entrance side of the form of filter shown in Fig. 6, a portion of the gas impinges upon the inner side of the filter, that is, wall 68, which is wet with the cleaning fluid, passes through perforation 71, impinges upon the wetted surface in the inner wall 67, thence through perforation 70, against the wet inner surface of wall 69 and escapes through perforation 72. With the other forms of filter shown, the surfaces exposed to passage of gas are wet intermittently, the wetting or cleaning fluid passing through the filter in the same direction as the gas, the impurities in the gas, such as soot, dust and the like, being removed by the film of water and being gradually carried to the exterior of the filter by the conjoint action of the flow of the gas and the impress of fresh cleaning liquid. The interposition of one or more perforated walls, is, of course, contemplated by the invention.

In Fig. 7 is shown another modified form of the wet filter of the present invention, wherein the filter is built up of segments or pockets, and in order to insure a substantially tight and rigid assembly, one end edge of the segment 75 is formed with groove 76, while the other end edge is formed with a tongue 77 to form a tongue and groove joint when segments are assembled in abutting relation. Segment 75 is formed with parallel perforated side walls 78 and 79, a closed bottom and open top so that the filling materials discussed hereinabove may be readily placed within the segments or pockets. To produce additional rigid assembly, keys 80 are formed upon the outer portion of the bottom 81 of segment 75, the segments being adapted to enter and register within the open top of another segment when assembled in superposed relationship.

From the foregoing it will be apparent that the present invention provides a filter of slight thickness and of high porosity and therefore of insignificant resistance, a filter easily and readily assembled and a filter adapted to be wet intermittently with cleaning fluid over large areas of continuous surface as contrasted to capillary filters heretofore used.

I claim:

In a smoke eliminator, a cylindrical casing comprising an annular filter wall and having one end thereof in communication with a furnace flue, the other end of said casing having a substantially imperforate closure wall, a housing about said cylindrical casing and spaced from said annular filter wall and said closure wall, a discharge conduit leading from said housing, movable wetting means within said cylindrical casing, means mounting said wetting means for movement about an axis coinciding with the axis of said annular filter wall and comprising combined transmission and conduit means extending through said closure wall and adapted to convey liquid and transmit motion to said movable wetting means, a fluid connection for connecting said conduit means with a source of liquid supply and a mechanical connection for transmitting motion to said transmission and conduit means, said fluid connection and said mechanical connection being disposed outside of said cylindrical casing and adjacent said closure wall, and a partition wall cooperating with said closure wall to form a compartment for said mechanical and fluid connection.

ALBERT PIETZSCH.